United States Patent
Zhang et al.

(10) Patent No.: US 9,924,544 B2
(45) Date of Patent: Mar. 20, 2018

(54) METHOD TO REPORT CHANNEL STATUS (71) Applicant: MediaTek Singapore Pte. Ltd., Singapore (SG)

(72) Inventors: Yuanyuan Zhang, Beijing (CN); Feifei Sun, Beijing (CN); Chia-Chun Hsu, New Taipei (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 125 days.

(21) Appl. No.: 14/784,321

(22) PCT Filed: Sep. 26, 2014

(86) PCT No.: PCT/CN2014/087559
§ 371 (c)(1),
(2) Date: Oct. 14, 2015

(87) PCT Pub. No.: WO2015/043509
PCT Pub. Date: Apr. 2, 2015

(65) Prior Publication Data
US 2016/0057785 A1    Feb. 25, 2016

Related U.S. Application Data

(63) Continuation-in-part of application No. PCT/CN2013/084497, filed on Sep. 27, 2013.

(51) Int. Cl.
*H04W 24/10* (2009.01)
*H04W 74/08* (2009.01)
(Continued)

(52) U.S. Cl.
CPC ..... *H04W 74/0833* (2013.01); *H04L 61/6022* (2013.01); *H04W 24/00* (2013.01);
(Continued)

(58) Field of Classification Search
None
See application file for complete search history.

(56) References Cited

U.S. PATENT DOCUMENTS

2009/0252053 A1\* 10/2009 Leith ................ H04W 24/10
370/252
2010/0131751 A1    5/2010 Reznik et al.
(Continued)

FOREIGN PATENT DOCUMENTS

CN    102123486    7/2011
CN    102469519    5/2012
(Continued)

OTHER PUBLICATIONS

International Search Report dated Dec. 31, 2014, issued in application No. PCT/CN2014/087559.

*Primary Examiner* — Robert C Scheibel
(74) *Attorney, Agent, or Firm* — McClure, Qualey & Rodack, LLP (57) ABSTRACT

Methods and apparatus are provided for a UE to send channel status reports (CSR) to a network entity. In one novel aspect, the CSR is generated at the MAC layer. In one embodiment, the UE detects one or more triggering event, obtains a value of channel status from the PHY layer, generates the CSR based on the value obtained from the PHY layer and transmits the channel status report to an eNB. In another embodiment, the UE starts a timer and waits for a UL grant to transmit the CSR. If no UL grant is received before the timer expires, the UE triggers either a dedicated SR or a random access SR. In another novel aspect, the channel status report is generated in a NAS message and sent to a NAS entity through the NAS layer. In one embodiment, the tracking-area-update procedure is used for the CSR.

20 Claims, 10 Drawing Sheets (51) Int. Cl.
  *H04W 24/00*    (2009.01)
  *H04L 29/12*    (2006.01)
  *H04W 72/04*    (2009.01)
  *H04W 72/14*    (2009.01)
  *H04W 88/02*    (2009.01)
  *H04L 5/00*     (2006.01)

(52) U.S. Cl.
  CPC ....... *H04W 24/10* (2013.01); *H04W 72/0413* (2013.01); *H04W 72/14* (2013.01); *H04L 5/0057* (2013.01); *H04W 88/02* (2013.01)

(56) References Cited

U.S. PATENT DOCUMENTS

| | | | | |
|---|---|---|---|---|
| 2010/0220618 A1* | 9/2010 | Kwon | ............... | H04W 72/1284 370/252 |
| 2011/0110258 A1* | 5/2011 | Ishii | ............... | H04B 7/155 370/252 |
| 2012/0014275 A1* | 1/2012 | Koo | ............... | H04L 1/0014 370/252 |
| 2012/0281580 A1* | 11/2012 | Lee | ............... | H04W 74/008 370/252 |
| 2013/0188503 A1* | 7/2013 | Anepu | ............... | H04W 24/10 370/252 |
| 2013/0272255 A1* | 10/2013 | Zhu | ............... | H04B 7/0486 370/329 |
| 2014/0044205 A1* | 2/2014 | Kim | ............... | H04B 7/0404 375/260 |
| 2014/0313908 A1* | 10/2014 | da Silva | ............... | H04W 4/005 370/252 |
| 2016/0262174 A1* | 9/2016 | Fujishiro | ............... | H04B 7/024 |

FOREIGN PATENT DOCUMENTS

| | | |
|---|---|---|
| EP | 2409511 | 1/2012 |
| WO | 2010107358 A1 | 9/2010 |
| WO | WO 2013/127634 | 9/2013 |

* cited by examiner

METHOD TO REPORT CHANNEL STATUS

CROSS REFERENCE TO RELATED APPLICATIONS

This application is a National Phase Application of PCT Application No. PCT/CN2014/087559, filed on Sep. 26, 2014, which is a continuation-in-part of International Application No. PCT/CN2013/084497, entitled "METHOD TO REPORT CHANNEL STATUS" filed on Sep. 27, 2013; the subject matter of which is incorporated herein by reference.

TECHNICAL FIELD

The disclosed embodiments relate generally to wireless communication systems, and, more particularly, to method to report channel status.

BACKGROUND

Third generation partnership project (3GPP) and Long Term Evolution (LTE) mobile telecommunication systems provide high data rate, lower latency and improved system performances. However, such systems are optimized for regular data communications.

For example, machine-to-machine (M2M) applications required low-cost devices and improved coverage other than current cellular communication system. For example, some smart-metering deceives suffer a significantly larger path-loss (e.g., 20 dB path loss) than that in the typical operation condition of normal devices, which are often installed in the basements of residential buildings or locations shielded by foil-backed insulation, metalized windows, or traditional thick-walled building construction. In order to serve these devices, 3GPP RAN1 working group have studied for coverage improvement and cost reduction for these MTC devices in coverage-hole scenario. Some potential solutions have been identified such as repetition of the physical channels to improve the coverage. In addition, cost reduction techniques are studied, including reducing the data buffer size and operation bandwidth, reducing receiving the antenna number and so on. To better serve the mobile devices equipment with these new solutions, it is important properly allocate radio resources for the mobile devices, such as repetition number of each physical channel, the corresponding transmission power and other channel status. Currently, some status data, such as CQI, are reported by the mobile devices in the physical (PHY) layer. These reports in the PHY layer also require repetitions of transmission to meet the requirement of reliability when UE endures coverage problems, which would be a big burden to physical control channels due to the signaling overhead. Considering the radio resource limitation of physical control channels, the normal UEs without coverage problem will be impaired if large amount of radio resources are utilized by repetition transmissions. A channel status report through physical share channel needs to be sent by the mobile device reliably to the network to assist the proper allocation of the radio resource.

Improvements and enhancements are required for UE to send channel status report to the network reliably.

SUMMARY

Apparatus and method are provided to send channel status reports by the UE to a network entity. In one novel aspect, the UE obtains the channel status information from the PHY layer and generates channel status reports at the MAC layer. The UE sends the channel status reports to an eNB. In one embodiment, the UE detects one or more triggering event. Upon detecting the triggering event, the UE obtains a value of channel status from a physical layer of the UE. The UE generates a channels status report in the MAC layer of the UE. The channel status report is based on the value of the channel status obtained from the PHY layer. The UE transmits the channel status report to a network entity. In one embodiment, the UE obtains a UL grants before obtaining the value of the channel status from the PHY layer. In one embodiment, the triggering events is at least one of: performing an initial access to the network through a random access procedure, performing a re-establishment through a random access procedure, detecting changes of the channel status value being over a predefined threshold, receiving a request for the channel status report from the wireless network, and detecting a coverage problem. In one embodiment, obtaining the UL resource involves waiting for a UL grant and determining if the received UL grant can accommodated MAC CE plus the subheader for the channel status report. In another embodiment, a timer is started or restarted upon detecting the one or more channel-status-report triggering events. If there is no UL grant received before the timer expires, the UE triggers a scheduling request (SR). In one embodiment, the UE triggers a dedicated SR for the channel status report. In another embodiment, the UE trigger a random access SR for the channel status report. In one embodiment, the UE sends the channel status reports through Msg3 upon receiving a random access response message during an initial access through a random access procedure. In one embodiment, the channel status report is included in a MAC CE. In another embodiment, the channel status report is in a MAC subheader.

In another novel aspect, the UE obtains the channel status information from the PHY layer and generates channel status reports at the NAS layer. The UE sends the channel status reports to an MME through the NAS layer. In one embodiment, the UE detects one or more triggering events. The UE obtains a value of the channel status from a PHY layer of the UE. The UE generates a channel status report in a NAS layer message. The UE transmits the NAS message to an NAS entity in the wireless network. In one embodiment, the triggering event comprises detecting changes of the channel status value being over a predefined threshold, and detecting a coverage problem. In another embodiment, the UE initiates a tracking area updating procedure to transmit the NAS message. The UE includes the channel status report in the Tracking Area Update Request message.

Other embodiments and advantages are described in the detailed description below. This summary does not purport to define the invention. The invention is defined by the claims.

BRIEF DESCRIPTION OF DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Channel status reports are generated by the UE to indicate the UE channel status.

Figure 1:
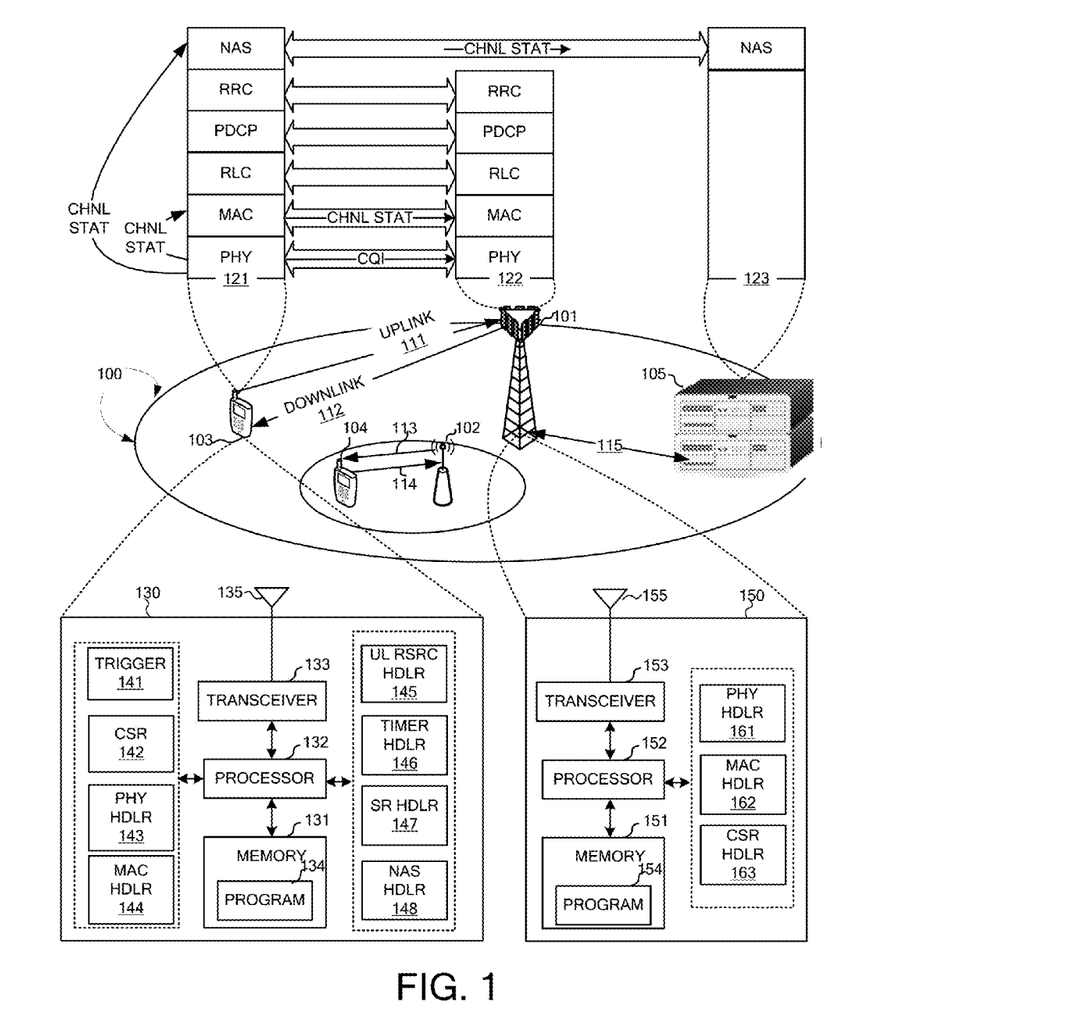
FIG. 1 illustrates an exemplary mobile communication network with UEs sending channel status reports to the network in accordance with embodiments of the current invention.

FIG. 1 illustrates an exemplary mobile communication network 100 with UEs sending channel status reports to the network in accordance with embodiments of the current invention. Wireless communication network 100 includes one or more fixed base infrastructure units forming a network distributed over a geographical region. The base unit may also be referred to as an access point, access terminal, base station, Node-B, eNode-B, or by other terminology used in the art. In FIG. 1, the one or more base stations 101 and 102 serve a number of mobile stations 103 and 104 within a serving area, for example, a cell, or within a cell sector. In some systems, one or more base stations are communicably coupled to a controller forming an access network that is communicably coupled to one or more core networks. The disclosure however is not intended to be limited to any particular wireless communication system. Generally, the serving base station 101 and 102 transmit downlink communication signals 112 and 113 to mobile station in the time and/or frequency domain. UE or Mobile station 103 and 104 communicate with one or more base stations 101 and 102 via uplink communication signals 111 and 114. UE or the mobile station may also be referred to a mobile phone, laptop, and mobile workstation and so on. In FIG. 1, wireless communication network 100 is an OFDM/OFDMA system comprising a base station eNB 101 eNB 102 and a plurality of mobile station 103 and mobile station 104. When there is a downlink packet to be sent from eNB to mobile station, each mobile station gets a downlink assignment, e.g., a set of radio resources in a physical downlink shared channel (PDSCH). When a UE needs to send a packet to eNB in the uplink, the mobile station gets a grant from the eNB that assigns a physical downlink uplink shared channel (PUSCH) consisting of a set of uplink radio resources. The mobile station gets the downlink or uplink scheduling information from a physical downlink control channel (PDCCH) or an enhanced physical downlink control channel (EPDCCH) that is targeted specifically to that mobile station. The downlink or uplink scheduling information and the other control information, carried by PDCCH, is referred to as downlink control information (DCI). In wireless communication network 100, the one or more base stations connect with control units. As shown, eNB 101 connects with a MME 105 through a link 115. Link 115 is a signal link using S1 interface.

FIG. 1 also shows an exemplary diagram of protocol stacks for UE 103, eNB 101 and MME 105. UE 103 has a protocol stack 121, which includes the physical (PHY) layer, the medium access control (MAC) layer, the radio link control (RLC) layer, the pack data convergence protocol (PDCP) layer, the radio resource control (RRC) layer, and the non-access stratum (NAS) layer. Similarly, eNB 101 has a user plane protocol stack 122. On one side, protocol stack 122 connects with protocol stack 121. The UE-eNB protocol stack 122 includes the PHY layer, the MAC layer, the RLC layer the PDCP layer and the RRC layer. On the other side, protocol stack 122 connects with a MME protocol stack 123 of MME 105.

As shown in the exemplary user plane diagram, each layer has the defined functions. For example, the channel quality indicator (CQI), which is physical layer control signaling, is sent from the UE to the eNB through the PHY layer. CQI indicates the instantaneous communication channel quality. Different from CQI reporting through PHY layer, the channel situation reporting is reported through higher layer, e.g. MAC layer or NAS layer. The channel situation is also evaluated by measuring the downlink (DL) reference signals, through which RSRP, RSRQ, RSSI and CQI as well as other metrics can be derived. These measurement results can be reported directly as channel status. Alternatively, the measurement results within a certain range can be quantified into different coverage levels and each level is assigned a channel status index. The reported channel status index and the corresponding coverage levels are defined in the specification.

In one novel aspect, a channel status report is sent from the UE to the eNB through the MAC layer. In another novel aspect, the channel status report is sent from the UE to the MME or other similar network entities through the NAS layer. FIG. 1 further illustrates that the UE obtains the channel status information or value from the PHY layer and the pack these information into the MAC layer or the NAS layer to send to the eNB or MME, respectively.

In one embodiment, the communication system utilizes MAC layer to control the upper layers' access to the communication medium. At the network side, the MAC layer decides how much radio resource should be allocated to data from which logical channel of the mobile station in both UL and DL. To achieve this, the MAC layer at the UE side performs assistant information reporting for network scheduling, multiplexing and de-multiplexing to combine and disassemble upper layer data units into/out of lower layer data units and HARQ data to transfer data units over the radio interface. Exemplary of MAC layer includes the developing Long Term Evolution (LTE) of the 3GPP UMTS standard and IEEE 802.16 standard.

For coverage-hole devices, PDCCH or EPDCCH may need repetitions across multiple subframes. In the meanwhile, the PDSCH and/or PUSCH of the devices may also need across subframe transmission, retransmission or repetition. In order to determine the repetitions number (or the number of subframes occupied by the data channel or the control channel) for each physical channel in both DL and UL based on the channel situation, a method to report the channel status is necessary. The channel situation is obtained by measuring the DL reference signals, through which RSRP, RSRQ, RSSI, CQI as well as other metrics used for channel quality evaluation can be derived. These measurement results can be reported directly as channel status. Alternatively, the measurement results within a certain range can be quantified into different coverage levels and each level is assigned a channel status index. The reported channel status index and the corresponding coverage levels can be pre-defined or dynamically configured.

In another embodiment, a method for a mobile station to report the channel status includes: triggering a CSR when certain event occurs; obtaining the value of the channel status from the lower layer when there is at least one UL resource for new transmission; transmitting a CSR with at least one UL resource; and canceling the triggered CSR. The events include but not limited to the following ones: 1) the mobile station is performing initial access or re-establishment to the network through random access procedure; 2) the channel status has changed since the last transmission of CSR; 3) the channel status has changed more than a threshold since the last transmission of CSR, wherein the threshold is configured by the network; 4) a request for CSR is received from the network; 5) the coverage problem is detected, e.g. the channel quality is worse than a predefined threshold. For example, the threshold can be set to different values according to different situations. When the mobile station uses a special PRACH resource or when it cannot detect normal mode downlink physical channel (e.g., PBCH, PDCCH, PDSCH, and PHICH) for a period of time or when the channel quality is worse than a predefined threshold, it can determine that a coverage problem occurs.

In one embodiment, a method for a mobile station to transmitting a CSR further comprising: instructing the Multiplexing and Assembly procedure to generate the CSR MAC control element (CE) if the allocated UL resources can accommodate a CSR MAC CE plus its subheader. The UL resources used for CSR transmission should be allocated by the network, which can be assigned semi-persistently through configuration or assigned dynamically through UL grants. One example of the MAC CE is that it has a fixed size of zero bits with two reserved bits in the subheader used to indicate four levels of channel status. Another example of the MAC CE is that it has a fixed size of one byte. Some bits are used as the fields of CSR, while others are reserved bits. A new LCID is assigned to the MAC CE for CSR.

In another embodiment of the present invention, when performing multiplexing and assembling to generate the CSR MAC CE, the mobile station takes into account the following relative priority in decreasing order: MAC CE for C-RNTI or data from UL-CCCH; MAC CE for BSR, with exception of BSR included for padding; MAC CE for CSR; other MAC CE and data from other logical channels except UL-CCCH. In other words, CRS MAC CE takes precedence over other MAC CE and data from other logical channels, but has lower priority than MAC CE for C-RNTI or data from UL-CCCH as well as MAC CE for BSR, with the exception of BSR included for padding.

In yet another embodiment, a method for a mobile station to report the channel status includes: triggering a CSR upon initiating random access procedure, e.g. upon transmission of random access preamble; obtaining the value of the channel status from the physical layer when UL grant is received in the random access response; transmitting the a CSR with the allocated UL resources in the Message subsequent to random access response such as Msg3 and canceling the triggered CSR.

In one embodiment, a method for a mobile station to transmit a CSR in Msg3 further comprises instructing the Multiplexing and Assembly procedure to generate the CSR MAC CE and placing the MAC CE at the beginning of the MAC PDU. The MAC CE has a fixed size of one byte without any subheader. In one embodiment, a method for a mobile station to placing the MAC CE at the beginning of a MAC PDU further comprises checking whether the allocated UL resources can accommodate other higher priority MAC SDUs/MAC CE as well as the corresponding subheaders together with the CSR MAC CE; placing the CSR MAC CE at the beginning of the MAC PDU if the allocated UL resources can accommodate; otherwise waiting for another UL grant for CSR transmission. After the communication between the mobile station and the network is established, i.e. the mobile station is in the RRC_CONNECTED state and performing data transfer to/from the network, the mobile station needs to monitor its channel situation and report the channel status timely upon detection that the channel status has changed or has changed more than a threshold since the last transmission of a CSR. The threshold can be configured by the network. If the channel status is reported during the initial random access through Msg3, the channel status is considered as the very first transmission.

In one embodiment, a method for a mobile station to report the channel status after initial random access further comprising: monitoring the channel situation; triggering a CSR when the channel status has changed or has changed more than a threshold since the last transmission of a CSR; obtaining the value of the channel status from the physical layer when there is at least one UL resource for new transmission, transmitting a CSR and canceling the triggered CSR. In another embodiment, a method for a mobile station to report the channel status after initial random access further comprises monitoring the request for CSR sent from the network; triggering a CSR when the request is received; obtaining the value of the channel status from the physical layer when having UL resource for new transmission; transmitting a CSR; and canceling the triggered CSR.

It is possible that the there is no UL resource available to transmit the CSR. One example of the case is that only DL traffic is transferred from the network to the mobile station and there are no UL services. Another example of the case is that the channel status of the mobile station becomes worse and the UL grant still cannot be received after several repetitions. In both of the cases, even a CSR is triggered, there will not be UL resource available to transmit the CSR. The triggered CSR remains pending until it is transmitted. In order to transmit the CSR timely upon the triggering, scheduling request needs to be sent to the network if there is no UL resource available.

In yet another embodiment, a method for a mobile station to report the channel status further comprises starting or re-starting a timer after a CSR is triggered; stopping the timer when the CSR is transmitted; triggering a scheduling request for UL radio resources when the timer expires; and sending a scheduling request to the network.

In one embodiment, a method for a mobile station to report the channel status further comprises determining whether there is potential UL radio resource available for CSR after a CSR is triggered; starting or re-starting timer if there is no potential UL radio resource; stopping the timer when the CSR is transmitted; triggering a scheduling request for UL radio resources when the timer expires; and sending a scheduling request to the network. Determining whether there is potential UL radio resource available for CSR should consider the occurrence of the following conditions: whether there is pre-configured UL radio resources, such as dedicated UL resources configured for semi-persistent scheduling; and whether there is any pending SR. If there is a pre-configured UL radio resource or there is SR pending, the mobile station will transmit the channel status with the configured UL resources or the UL resources requested from the network. Otherwise, the mobile station considers that there is no potential UL radio resource available. There are two types of scheduling request taking use of dedicated access channels such as physical UL control channel (PUCCH) or contention channels such as random access channel (RACH), i.e. dedicated-SR (D-SR) or RA-SR respectively. The mobile station utilizes RA-SR to request UL resources through random access procedure, while utilizes D-SR to request UL resources through the configured dedicated resources. When SR is triggered, the mobile station needs to determine which SR to utilize if both the RA-SR and D-SR are available.

In one embodiment, a method for a mobile station to send scheduling request comprises utilizing RA-SR if there is no D-SR configured or the channel status becomes worse or it becomes worse than a pre-defined threshold; otherwise utilizing D-SR. In another embodiment, the communication system utilizes NAS layer for mobility management and session management. NAS layer support the mobility of the mobile station and session management procedure to establish and maintain IP connectivity between the mobile station and the core network. In another embodiment, a method for a mobile station to report the channel status includes sending a NAS message to the network when certain events occurs; obtaining the value of the channel status from the lower layer. The events include but not limited to the following ones: 1) the channel status has changed; 2) the channel status has changed more than a threshold; 3) the coverage problem is detected, e.g. the channel quality is worse than a pre-defined threshold. In yet another embodiment, a method for a mobile station to sending a NAS message to the network further comprising: initiate the tracking area updating procedure, and sending the TRACKING AREA UPDATE REQUEST message containing the IE for channel status to the network.

FIG. 1 further illustrates simplified block diagrams 130 and 150 for UE 103 and eNB 101, respectively. Mobile station 103 has an antenna 135, which transmits and receives radio signals. A RF transceiver module 133, coupled with the antenna, receives RF signals from antenna 135, converts them to baseband signals and sends them to processor 132. RF transceiver 133 also converts received baseband signals from processor 132, converts them to RF signals, and sends out to antenna 135. Processor 132 processes the received baseband signals and invokes different functional modules to perform features in mobile station 103. Memory 131 stores program instructions and data 134 to control the operations of mobile station 103. Mobile station 103 also includes multiple function modules that carry out different tasks in accordance with embodiments of the current invention. A trigger handler 141 detects trigger events and triggers channel status report procedure upon detecting the one or more predefined triggering events. A channel status report (CSR) handler 142 handles CSR procedure. A PHY layer handler 143 obtains channel status information and passes it to the MAC layer for CSR generation. A MAC layer 144 receives channel status information from PHY layer handler 143 and generates channel status reports. A UL resource handler 145 handles obtaining UL resources for UE 103 to transmit the channel status reports. A timer handler 146 handles one or timers used for the channel status report procedure. A scheduling request (SR) handler 147 handles scheduling request for the channel status report. A NAS handler 148 generates channel status report to be sent to a MME through the NAS layer.

eNB 101 has an antenna 155, which transmits and receives radio signals. A RF transceiver module 153, coupled with the antenna, receives RF signals from antenna 155, converts them to baseband signals and sends them to processor 152. RF transceiver 153 also converts received baseband signals from processor 152, converts them to RF signals, and sends out to antenna 155. Processor 152 processes the received baseband signals and invokes different functional modules to perform features in eNB 101. Memory 151 stores program instructions and data 154 to control the operations of eNB 101. eNB 101 also includes multiple function modules that carry out different tasks in accordance with embodiments of the current invention. A PHY handler 161 handles physical layer information. A MAC handler 162 receives channel status reports from UEs, decodes and processes these reports. A CSR handler 163 processes the channel status reports received from the MAC layer.

Figure 2:
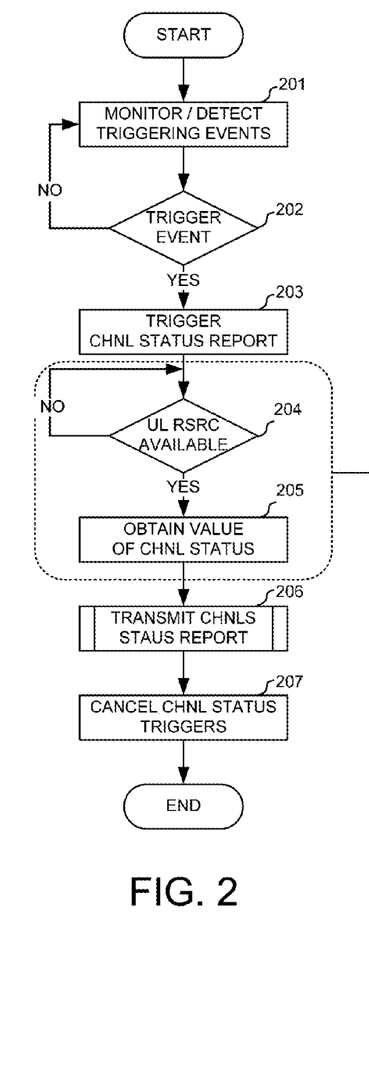
FIG. 2 illustrates an exemplary flowchart for a UE to report the channel status in accordance with embodiments of the current invention.

FIG. 2 illustrates an exemplary flowchart for a UE to report the channel status in accordance with embodiments of the current invention. The mobile station monitors the occurrence of at least one triggering event in step 201. At step 202, the mobile station determines if one or more triggering event occurs. If the at least one triggering event occurs at step 202, the mobile station triggers a CSR at step 203. At step 204, the mobile station determines if any UL resource is available for new transmission. If step 204 determines that there are no UL resources available, the UE stays at step 204 and waits for UL resources. If step 204 determines there are one or more UL resources available, the UE obtains the channel status value from the lower layer at step 205. Then the mobile station moves to step 206 and transmits the CSR with the allocated UL resources. At step 207, the mobile station cancels all the triggered CSR.

Figure 3:
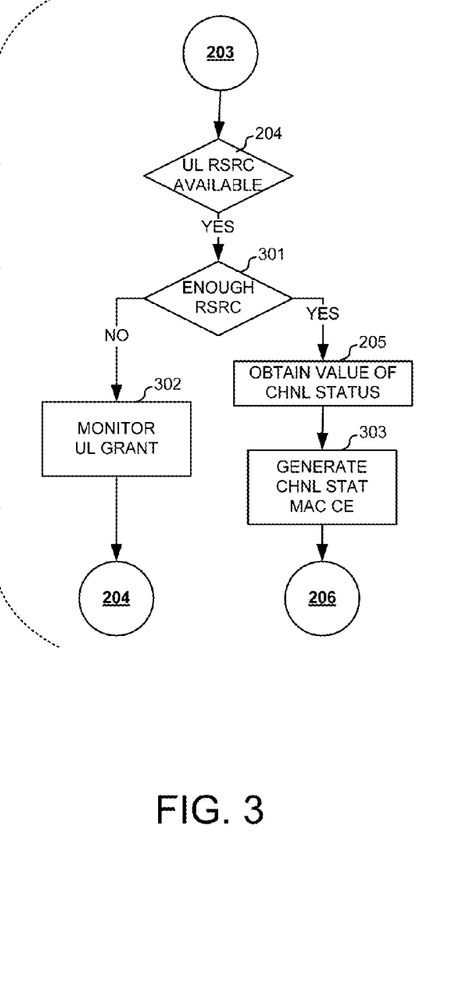
FIG. 3 illustrates an exemplary flowchart for the UE to obtain UL resource for the channel status report in accordance with embodiments of the current invention.

FIG. 3 illustrates an exemplary flowchart for the UE to obtain UL resource for the channel status report in accordance with embodiments of the current invention. Upon detecting one or more triggering event, the UE would try to obtain UL resource to send the channel status reports. Continuing from step 203 as shown in FIG. 1 the UE checks if there are UL resources available at step 204. If step 204 determines there are UL resources, the UE moves to step 301 to determine is the UL resource is enough for the channel status report. The UE checks if the UL resources can accommodate the control element (CE) including the channel status report at the MAC layer plus its sub-header. If step 301 determines that there are not enough resources, the UE moves to step 302 to continue monitoring the UL grants, which continues to step 204 in FIG. 2. If step 301 determines that there are enough resources, the UE obtains the channel status value from the lower layer at step 205, and instructs the multiplexing and assembly procedure to generate the MAC CE at step 303. Upon finishing step 303, the UE moves to step 206 in FIG. 2.

Figure 4A:
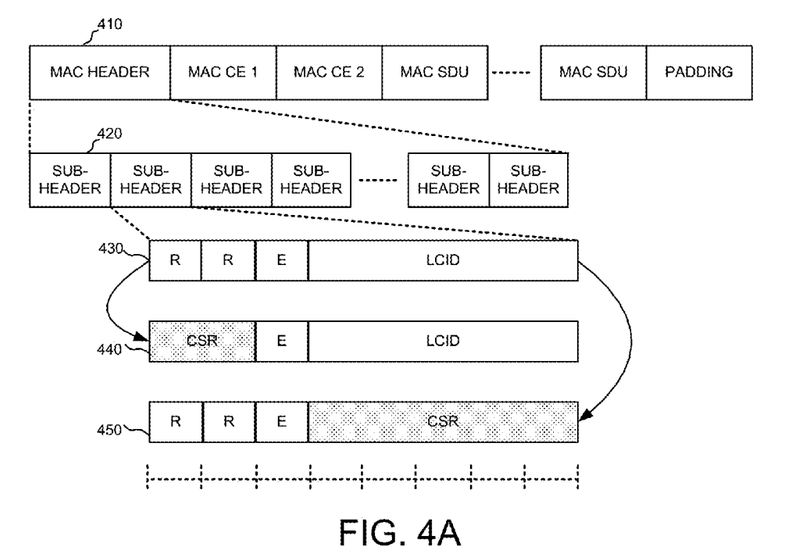
FIG. 4A illustrates an example of the MAC CE for CSR for the present invention in accordance with embodiments of the current invention.
Figure 4B:
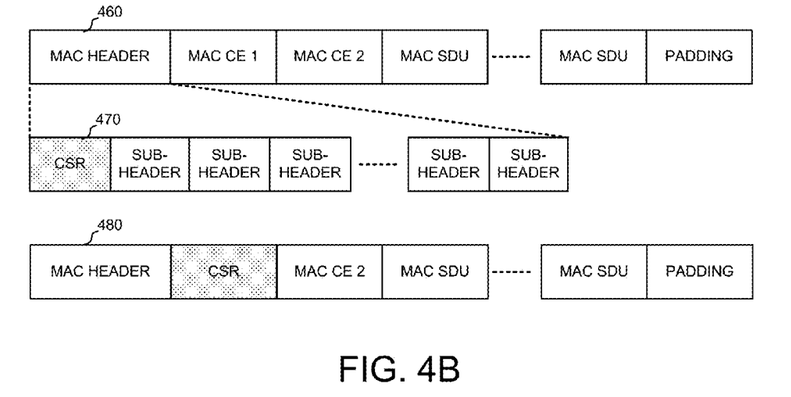
FIG. 4B illustrates an example of the MAC CE for CSR transmitted through Msg3 in accordance with embodiments of the current invention.

There are several options of including the channel status reports in the MAC layer. FIGS. 4A and 4B illustrate exemplary data format for the MAC PDU to include the channel status reports in accordance with embodiments of the current invention.

FIG. 4A illustrates an example of the MAC CE for CSR for the present invention in accordance with embodiments of the current invention. A MAC PDU 410 includes a MAC header, MAC CE-1, MAC CE-2, MAC SDUs, and padding bits. MAC header 420 further includes multiple sub-header. Each sub-header 430 contains two R-bit, one E-bit and a five-bit of logical channel ID (LCID) as shown in 430. In one embodiment, as shown in 440, the MAC CE containing the channel status report has a fixed size of zero bits with two reserved bits in the sub-header to indicate four levels of channel status. In another embodiment, a new logical channel ID (LCD) is assigned to the MAC CE for CSR as shown in 450.

FIG. 4B illustrates an example of the MAC CE for CSR transmitted through Msg3 in accordance with embodiments of the current invention. A data block 460 is a MAC PDU includes a MAC header, a MAC CE-1, a MAC CE-2, MAC SDUs and one or more padding bits. A data block 470 shows the MAC header of data block 460. Data block 470 includes multiple sub-headers. In one embodiment, as shown in 470, one of the sub-headers is used as for the channel status report. In one embodiment, the first sub-header of the MAC header data block 470 is used for the channel status reports. A MAC CE has a fixed length of one byte. Accordingly, in one embodiment, the MAC CE is used for the channel status report as shown in data block 480. In yet another embodiment, five-bit of the MAC CE is used for the channel status reports, while the other three-bit are used as reserved bits.

Figure 5:
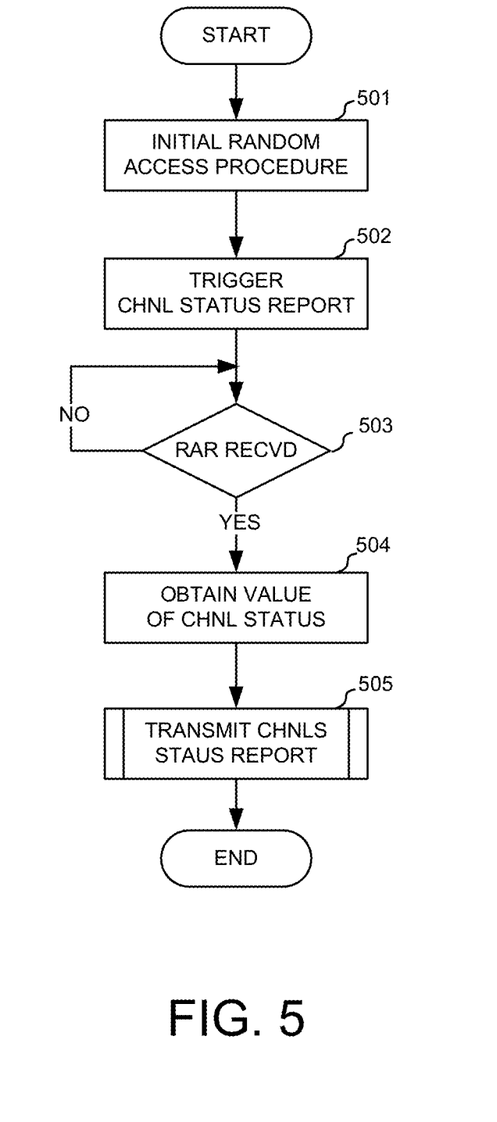
FIG. 5 illustrates a flowchart for a mobile station to report channel status during initial random access in accordance with embodiments of the current invention.

FIG. 5 illustrates a flowchart for a mobile station to report channel status during initial random access in accordance with embodiments of the current invention. When the mobile station performs initial random access to the network in step 501, such as transmitting preamble, it triggers a CSR in step 502. If random access response is received in step 503, the mobile station will obtain the value of channel status in step 504, indicate to the Multiplexing and assembly entity to include a CSR MAC CE in Msg3 in step 505, obtain the MAC PDU to transmit from the "Multiplexing and assembly" entity and store it in the Msg3 buffer in step 506. If the random access response is not received at step 503, the mobile device stays at step 503 to continue monitoring the random access response message.

Figure 6:
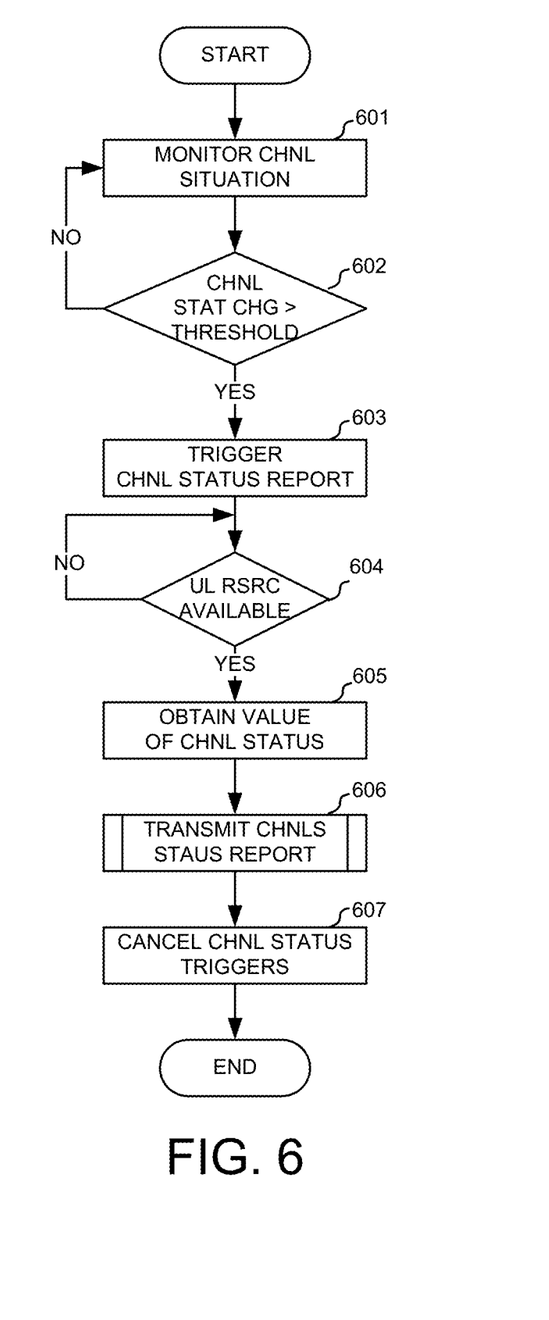
FIG. 6 illustrates a flowchart of an example for a mobile station to report channel status after RRC connection is established in accordance with embodiments of the current invention.

FIG. 6 illustrates a flowchart of an example for a mobile station to report channel status after RRC connection is established in accordance with embodiments of the current invention. The CSR transmitted in Msg3 is considered as the very first transmission. When in RRC_CONNECTED state, the mobile station monitors the channel status in step 601. If the channel status has changed more than a pre-defined threshold as determined at step 602, a CSR is triggered in step 603. If step 602 determines that, the channel status has not changed more than the pre-defined threshold, the mobile station moves back to step 601 to continue monitoring the channel situation. If there is UL resource available for new transmission as determined at step 604, the mobile station will obtaining the CSR value from the physical layer in step 505 and transmitting the CSR with the allocated resources in step 606. The mobile station moves to step 607 to cancel triggered CSR is cancelled. If at step 604, the mobile station determines there are no UL resources available, mobile station stays at step 604 to wait for UL resources.

Figure 7:
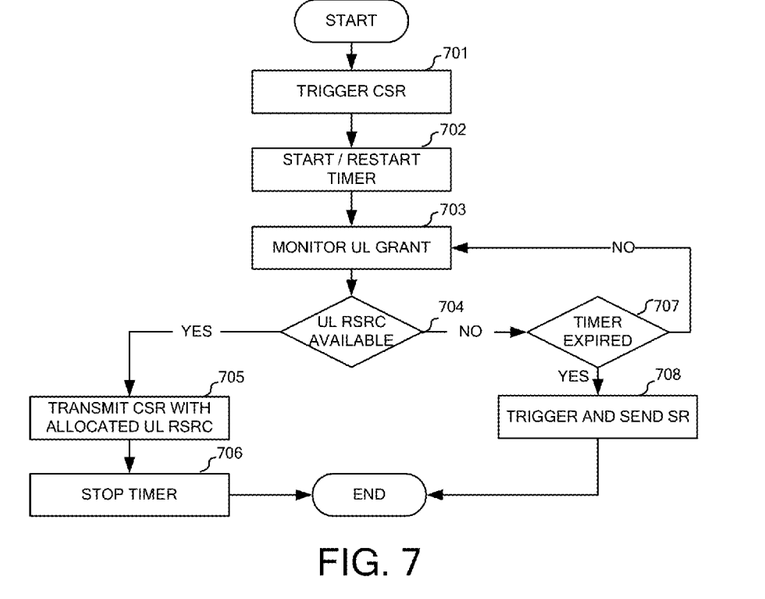
FIG. 7 illustrates a flowchart of an example for a mobile station to request UL resource for CSR through triggering and sending scheduling request in accordance with embodiments of the current invention.

FIG. 7 illustrates a flowchart of an example for a mobile station to request UL resource for CSR through triggering and sending scheduling request in accordance with embodiments of the current invention. When the CSR triggering events occurs, the mobile station triggers a CSR in step 701. The mobile station starts or restarts a timer in step 702 and monitors UL grant continuously in step 703. If a UL grant for new transmission is received in step 704, the mobile station transmits the CSR with the allocated resource in step 705 and stops the timer in step 706. Otherwise, if a UL grant for new transmission is not received at step 704, the mobile station checks whether the timer expires or not. If the timer expires in step 707, it will trigger and send a scheduling request to the network in step 708. Otherwise, if the timer is not expired at step 707, the mobile station continues monitoring UL grants until the timer expires.

Figure 8:
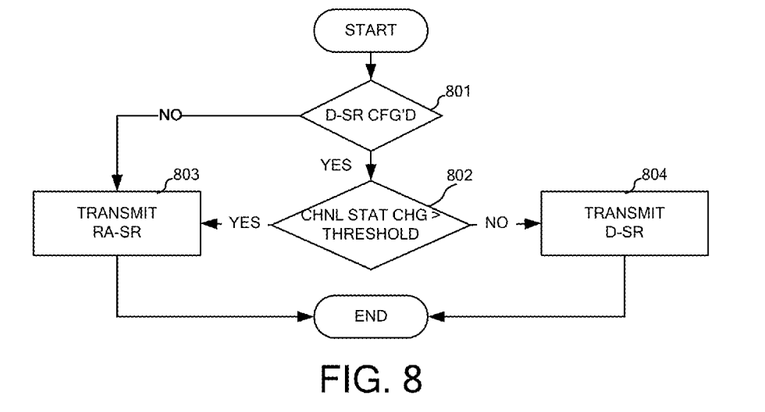
FIG. 8 illustrates a flowchart of an example for a mobile station to send scheduling request for CSR report in accordance with embodiments of the current invention.

FIG. 8 illustrates a flowchart of an example for a mobile station to send scheduling request for CSR report in accordance with embodiments of the current invention. When the mobile station triggers a scheduling request for CSR report, it checks whether there is dedicated SR configured in step 801. If no dedicated SR is configured, it will utilize random access scheduling request (RA-SR) in step 803. Otherwise, if step 801 determines there is dedicated SR configure, the mobile station checks further whether channel status becomes worse or worse than a predefined threshold in step 802. If the channel status becomes better or does not become worse than the threshold, the mobile station moves to step 804. At step 804, the mobile station utilizes dedicated scheduling request (D-SR). If at step 802, the mobile station determines that the channel status becomes worse or becomes worse than a threshold, the mobile station moves to step 803, which utilizes RA-SA.

Figure 9:
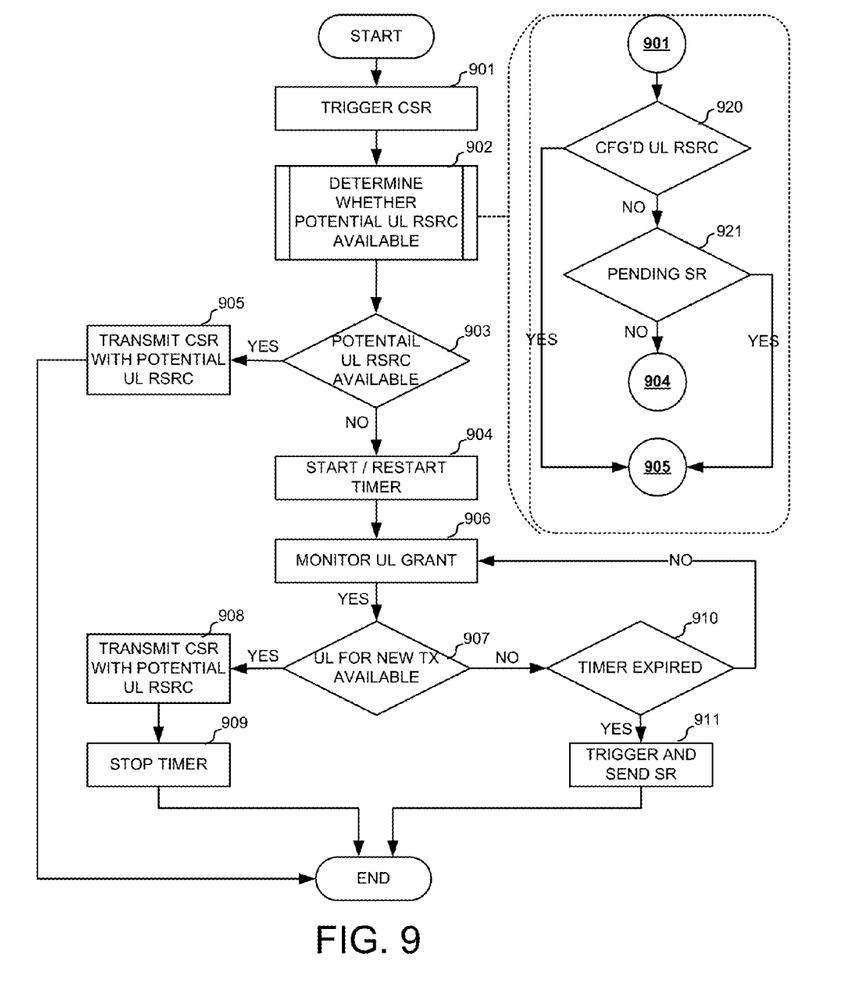
FIG. 9 illustrates a flowchart of another example for a mobile station to request UL resource for CSR through triggering and sending scheduling request in accordance with embodiments of the current invention.

FIG. 9 illustrates a flowchart of another example for a mobile station to request UL resource for CSR through triggering and sending scheduling request in accordance with embodiments of the current invention. When the CSR triggering events occurs, the mobile station triggers a CSR in step 901. The mobile station checks whether there is at least one potential UL resource available in step 902, which considers two conditions. The mobile station checks the two conditions in step 903, which determines whether there are potential UL resources available. At step 920, the mobile station determines the first condition, which is whether there is configured UL resource. If step 920 determines there is no UL resource configure, the mobile station moves to step 921. If step 920 determines there is UL resource configured, the mobile station moves to step 905. At step 921, the mobile station determines whether there is any pending scheduling request. If there are pending scheduling requests, the UE moves to step 905. If there is no pending scheduling request, the UE moves step 904. If there were potential UL resources available determined in step 903, the mobile station would utilize the potential UL resource for CSR transmission in step 905. Otherwise, if there is no potential UL resource available, the mobile station starts or restarts a timer in step 904 and monitors UL grant continuously in step 906. If UL grant for new transmission is received as determined in step 907, the mobile station transmits the CSR with the allocated resource in step 908 and stops the timer in step 909. Otherwise, the mobile station checks whether the timer expires or not in step 910. If the timer expires, it will trigger and send scheduling request to the network in step 911.

Otherwise, if UL grant for new transmission is received as determined in step 907, the mobile station continues monitoring UL grants. At step 910, the mobile station determines if the timer expires. If step 910 determines that the timer expired, the mobile station moves to step 911 to trigger and send an SR. If step 910 determines that the timer is not expired, the mobile station moves back to step 906 to continue monitor UL grants.

Figure 10:
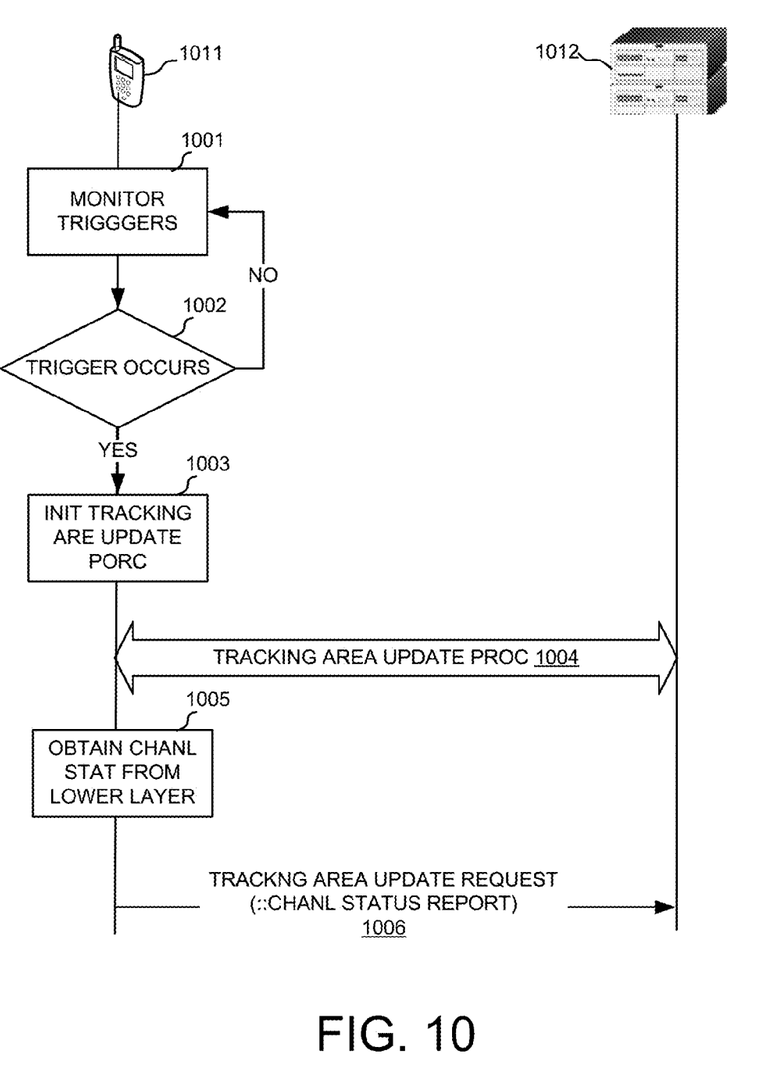
FIG. 10 illustrates a flowchart of an example for a mobile station to report channel status through NAS procedure in accordance with embodiments of the current invention.

In one novel aspect, the UE obtains channel status information and generates channel status reports at NAS layer. The UE sends the channel status report directly to an MME through the NAS layer. FIG. 10 illustrates a flowchart of an example for a mobile station to report channel status through NAS procedure in accordance with embodiments of the current invention. A mobile station 1011 connects with an MME 1012 through the NAS layer. Mobile station 1011 monitors the occurrence of the triggering events in step 1001. If no trigger event occurred, mobile station 1011 stays at step 1001 to continue monitoring the triggering events. If the triggering events occur in step 1002, mobile station 1011 initiates tracking area update procedure in step 1003. At step 1004, mobile station 1011 and MME 1012 enter the tracking-area-update procedure. Then mobile station 1011 obtains the channel status value from the lower layer in step 1005 and generates a NAS layer CSR. At step 1006, mobile station 1011 transmits TRACKING AREA UPDATE REQUEST message to MME 1012 containing the CSR.

Figure 11:
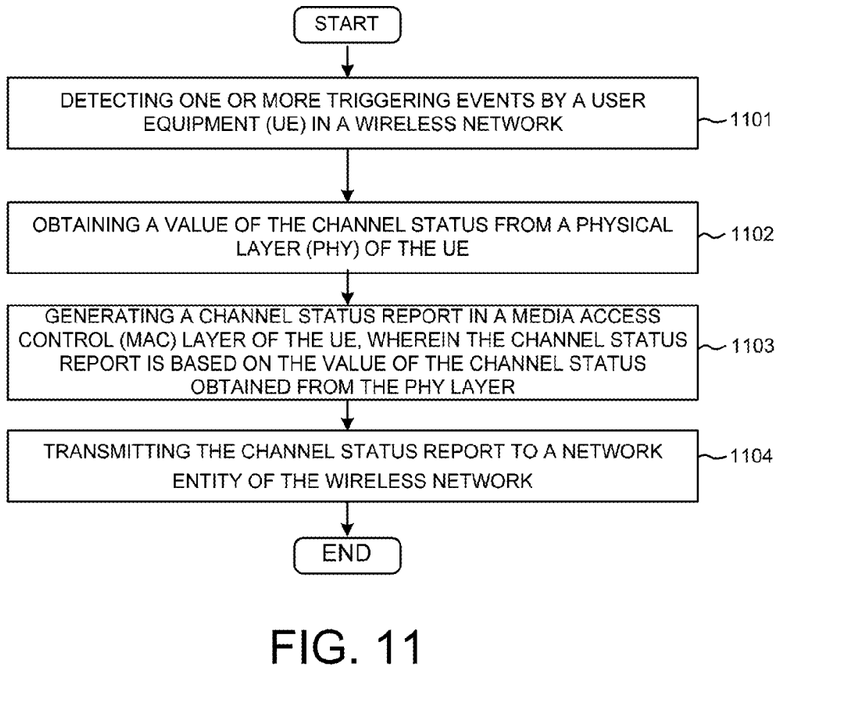
FIG. 11 is an exemplary flow diagram of a UE sending the channel status reports to an eNB using the MAC layer in accordance with embodiments of the current invention.

FIG. 11 is an exemplary flow diagram of a UE sending the channel status reports to an eNB through the MAC layer in accordance with embodiments of the current invention. At step 1101, the UE detects one or more triggering events in a wireless network. At step 1102, the UE obtains a value of the channel status from a physical layer (PHY) of the UE. At step 1103, the UE generates a channel status report in a media access control (MAC) layer of the UE, wherein the channel status report is based on the value of the channel status obtained from the PHY layer. At step 1104, the UE transmits the channel status report to a network entity of the wireless network.

Figure 12:
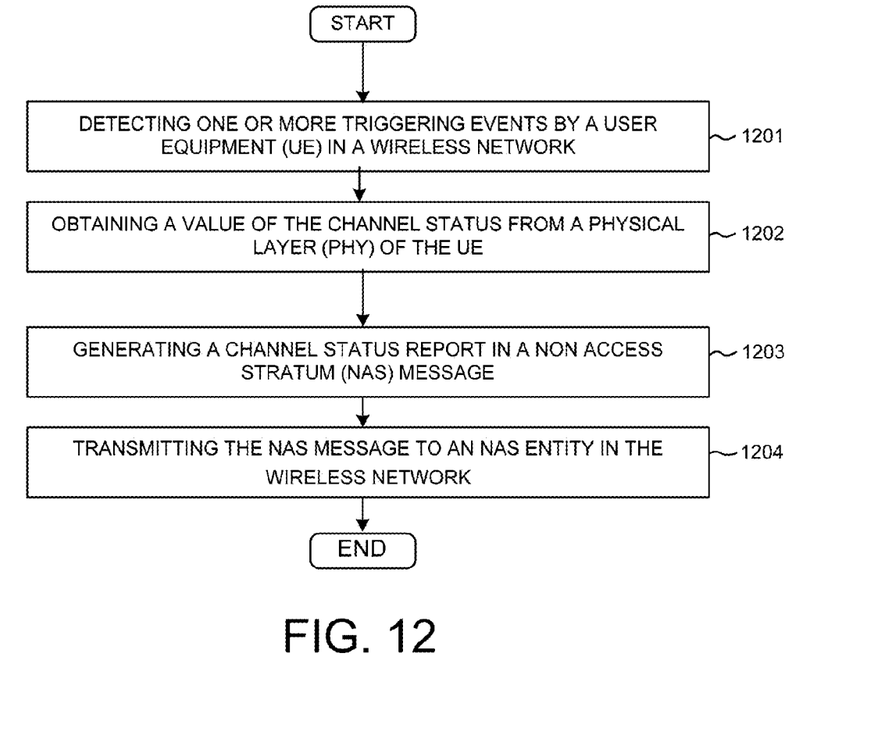
FIG. 12 is an exemplary flow diagram of a UE sending the channel status reports to an MME through the NAS layer in accordance with embodiments of the current invention.

FIG. 12 is an exemplary flow diagram of a UE sending channel status reports to an MME through the NAS layer in accordance with embodiments of the current invention. At step 1201, the UE detects one or more triggering events in a wireless network. At step 1202, the UE obtains a value of the channel status from a physical layer (PHY) of the UE. At step 1203, the UE generates a channel status report in a non-access stratum (NAS) message. At step 1204, the UE transmits the NAS message to an NAS entity in the wireless network.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

The invention claimed is:

1. A method comprising:
   detecting one or more triggering events by a user equipment (UE) in a wireless network;
   obtaining a value of the channel status from a physical layer (PHY) of the UE;
   generating a channel status report in a media access control (MAC) layer of the UE, wherein the channel status report is based on the value of the channel status obtained from the PHY layer, wherein generating of the channel status report in the MAC layer comprises multiplexing and assembling the channel status report in a MAC control element (CE) with a UL resource, and generating a MAC subheader for the channel status report MAC CE; and
   transmitting the channel status report to a network entity of the wireless network.

2. The method of claim 1, wherein the triggering events comprises: performing an initial access to the network through a random access (RA) procedure, performing a re-establishment through a random access procedure, detecting changes of the channel status value being over a pre-defined threshold, receiving a request for the channel status report from the wireless network, and detecting a coverage problem.

3. The method of claim 1, further comprising: cancelling the one or more triggering events upon transmitting the channel status report.

4. The method of claim 1, further comprising: obtaining an uplink (UL) resource for the transmission of the channel status report before obtaining a value of the channel status from the PHY layer of the UE.

5. The method of claim 4, wherein the obtaining of the UL resource involves waiting for a UL grant and determining if the received UL grant can accommodate MAC control elements plus their subheaders that contain the channel status report.

6. The method of claim 4, wherein the obtaining of the UL resource involves:
   starting or restarting a timer upon detecting one or more channel-status-report triggering events;
   obtaining the UL resource through a uplink (UL) grant before the timer expires and transmitting the channel status report on the UL resource; and
   triggering and sending a scheduling request (SR) if the timer expired without receiving the UL grant.

7. The method of claim 6, wherein after transmitting the channel status report to a network entity of the wireless network, stop the timer.

8. The method of claim 6, wherein a dedicated SR is sent if a dedicated SR is configured and the channel status is not worse than a predefined threshold; and wherein a random access SR is sent if there is no dedicated SR configured or the channel status is worse than the predefined threshold.

9. The method of claim 6, wherein the starting or restarting the timer after detecting one or more channel-status-report triggering events further involves:
   determining if there is a potential UL resource available, wherein a potential UL resource is available when there is an UL resource configured or there is a pending scheduling request pending;
   obtaining the potential UL resource for channel status report transmission if determined there is one; and
   starting or restarting a timer if determined there is no potential UL resource.

10. The method of claim 1, wherein the triggering event is performing an initial access to the network through a random access procedure, and wherein the channel status report is transmitted on message 3 (MSG3) upon receiving a random access response (RAR).

11. The method of claim 1, wherein the multiplexing and assembling involves prioritizing contents based on a capacity of the UL resource, and wherein the relative priority in descending order is: MAC CE for C-RNTI or data from UL-CCCH, MAC CE for non-padding buffer status report; MAC CE for channel status report, and other MAC CEs and data from non-UL-CCCH logic channels.

12. The method of claim 1, wherein the UL resource is an message 3 (MSG3).

13. A user equipment (UE) comprising:
a transceiver that transmits and receives radio signals in a wireless network;
a trigger event detecting circuit that detects one or more triggering events;
a physical (PHY) layer reporting circuit that obtains a value of the channel status from a PHY layer of the UE;
a MAC layer channel status generating circuit that generates a channel status report in a MAC layer of the UE, wherein the channel status report is based on the value of the channel status obtained from the PHY layer, wherein the MAC layer channel status generating circuit multiplexes and assembles the channel status report in a MAC control element (CE) for a UL resource; and generating a MAC subheader for the channel status report MAC CE.

14. The UE of claim 13, wherein the triggering events comprises: performing an initial access to the network through a random access (RA) procedure, performing a re-establishment through a random access procedure, detecting changes of the channel status value being over a pre-defined threshold, receiving a request for the channel status report from the wireless network, and detecting a coverage problem.

15. The UE of claim 13, further comprising: an uplink (UL) resource handling circuit, wherein the UL resource handler obtains an uplink (UL) resource for the transmission of the channel status report upon detecting the one or more triggering events.

16. The UE of claim 15, wherein the UL resource handling circuit waits for a UL grant and determining if the received UL grant can accommodate MAC control elements that contain the channel status report plus their subheaders.

17. The UE of claim 15, wherein the UL resource handling circuit determines if there is a potential UL resource available, wherein a potential UL resource is available when there is an UL resource configured or there is a pending scheduling request pending; and
wherein the UL resource handler obtains the potential UL resource for channel status report transmission if determined there is one.

18. The UE of claim 15 further comprising:
a timer handling circuit that starts or restarts a timer upon detecting one or more triggering events, wherein the UL resource handler obtains an UL grant before the timer expires; and
a scheduling request (SR) handling circuit, wherein SR handler triggers and sends a SR upon detecting the timer expires without an available UL resource.

19. The UE of claim 18, wherein the SR handling circuit triggers and sends a dedicated SR is transmitted if a dedicated SR is configured and the channel status is not worse than a predefined threshold, and wherein a random access SR is transmitted if there is no dedicated SR configured or the channel status is worse than the predefined threshold.

20. The UE of claim 13, wherein the MAC layer channel status generating circuit prioritizes contents based on a capacity of the UL resource, and wherein the relative priority in descending order is: MAC CE for C-RNTI or data from UL-CCCH, MAC CE for non-padding buffer status report; MAC CE for channel status report, and other MAC CEs and data from non-UL-CCCH logic channels.

\* \* \* \* \*